J. HAMILTON.
AUTOMOBILE RIM.
APPLICATION FILED MAR. 12, 1909.
957,672.
Patented May 10, 1910.
2 SHEETS—SHEET 1.
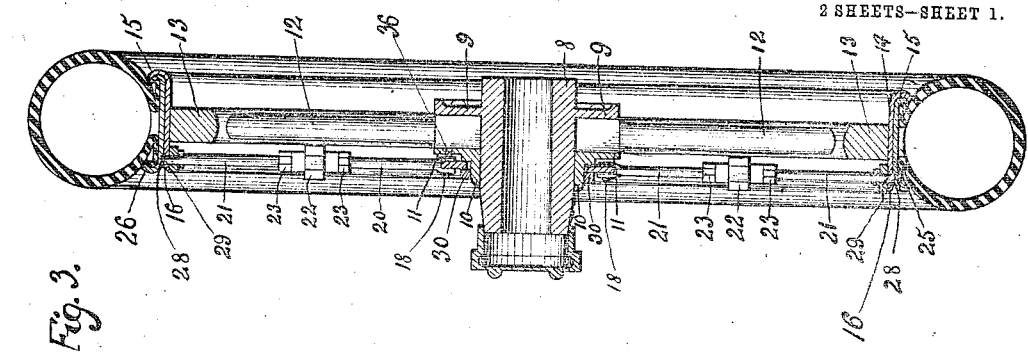
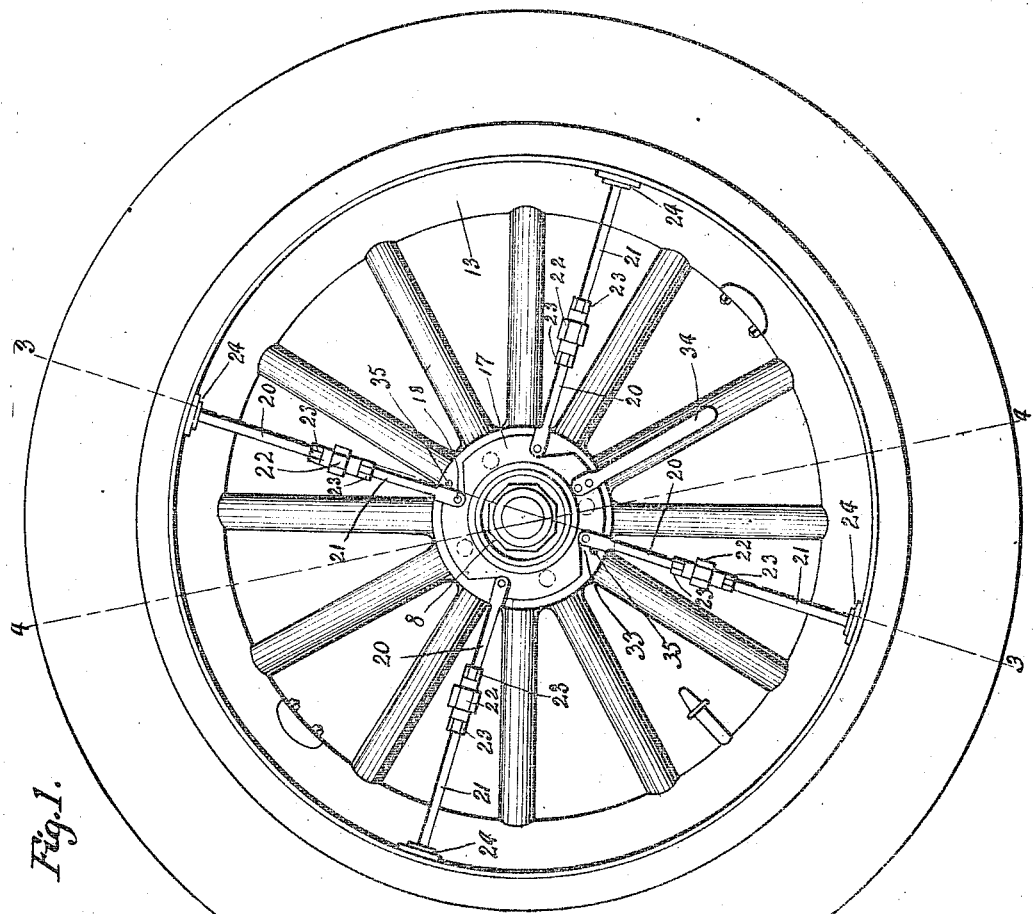
Inventor
James Hamilton.

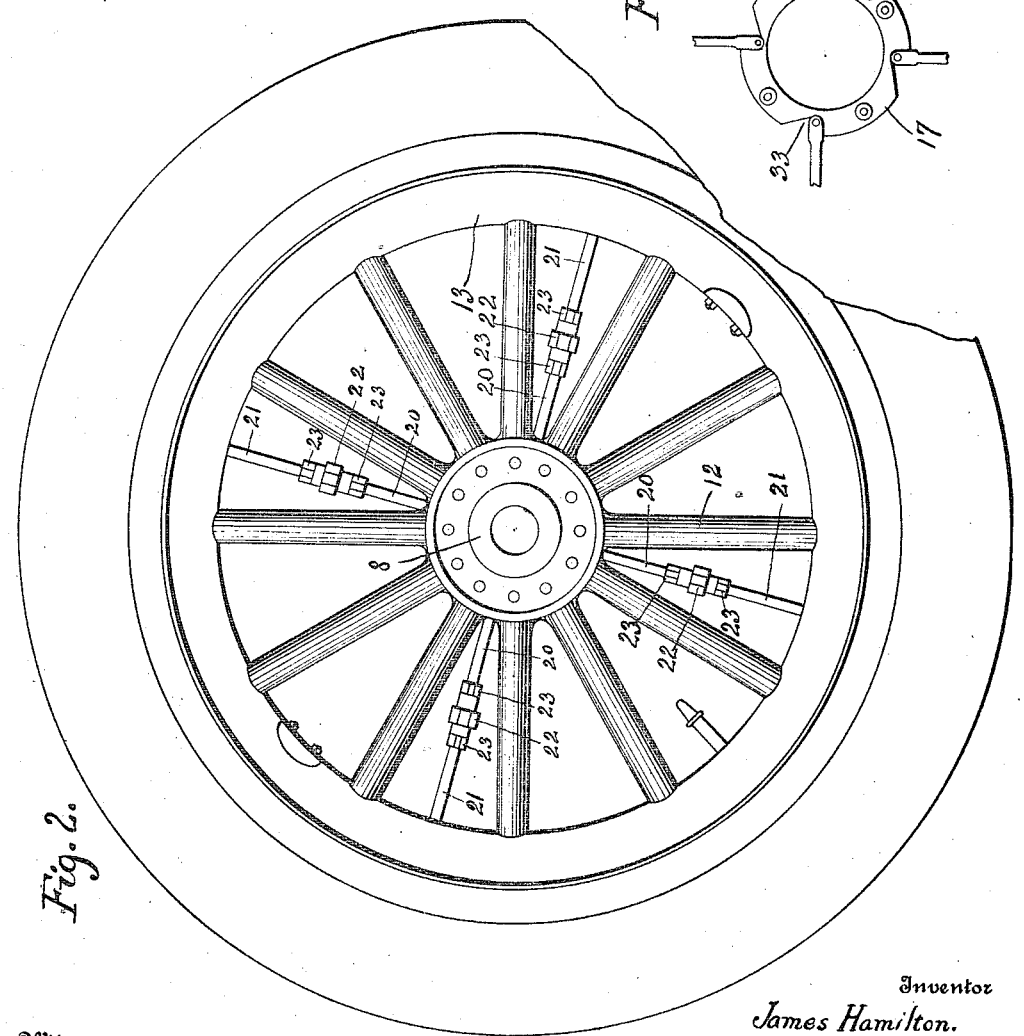

UNITED STATES PATENT OFFICE.

JAMES HAMILTON, OF WEIR, KANSAS.

AUTOMOBILE-RIM.

957,672.  Specification of Letters Patent.  Patented May 10, 1910.

Application filed March 12, 1909. Serial No. 483,090.

*To all whom it may concern:*

Be it known that I, JAMES HAMILTON, a citizen of the United States, residing at Weir city, in the county of Cherokee, State of Kansas, have invented certain new and useful Improvements in Automobile-Rims; and I do hereby declare the following to be a full, clear, and exact description of the invention, such as will enable others skilled in the art to which it appertains to make and use the same.

The invention relates to a tire supporting wheel rim, and more particularly to the class of detachable or demountable tire rims for automobiles or other vehicles.

The primary object of the invention is the provision of a demountable tire rim in which the same can be readily and quickly attached or detached from a wheel rim or felly without the necessity of detaching therefrom the tire or deflating the same which is customary when removing the tire from a wheel rim.

Another object of the invention is the provision of a detachable or demountable tire rim adapted to be quickly attached to and detached from a vehicle wheel so that upon puncturing a tire while in use the same may be removed from the vehicle wheel and a new one be substituted without unreasonable delay and by a person unfamiliar with the manner of mounting a tire upon a wheel rim.

A further object of the invention is the provision of a tire rim of this character which is simple in construction readily and easily mounted and detached at the will of an operator from a vehicle wheel, one that is thoroughly efficient in operation, durable and inexpensive in the manufacture.

With these and other objects in view the invention consists in the construction, combination and arrangement of parts, as will be hereinafter more specifically described, illustrated in the accompanying drawings, which disclose the preferred form of embodiment of the invention, and as brought out in the claims hereunto appended. However it is of course to be understood that changes, variations and modifications may be made such as come properly within the scope of the appended claims, without departing from the spirit of the invention.

In the drawings:—Figure 1 is a side elevation of a vehicle wheel with the invention applied thereto. Fig. 2 is an elevation looking toward the other side thereof. Fig. 3 is a sectional view on the line 3—3 of Fig. 1. Fig. 4 is a sectional view on the line 4—4 of Fig. 1. Fig. 5 is a detail fragmentary bottom plan view of the disk removed from the wheel.

Similar reference characters indicate corresponding parts throughout the several views in the drawings.

In the drawings the numeral 8 designates a hub which is of the usual ordinary construction and has formed thereon near its inner end a right angular annular flange 9, and a distance removed or spaced from the latter and fixedly mounted circumferentially upon the hub is a collar 10, formed with a right angular annular flange 11, which is disposed in parallelism with said flange 9, and therebetween are mounted the inner ends of a plurality of radially disposed spokes 12, which latter have their outer ends tenoned in an annular felly 13, which latter is preferably of wood although it may be of any other suitable material.

Secured to the outer peripheral face of the felly 13, is an annular rim 14, the opposite edges of which project a distance beyond opposite sides of the felly and the inner edge of said rim is curled outwardly and inwardly to form a clencher flange 15, while the opposite edge thereof is beveled as at 16, to permit the free mounting upon the rim of a removable or demountable rim as will be hereinafter described.

Rotatably mounted upon the collar 10, on the hub is a centrally perforated disk 17, the latter having connected thereto by pivot bolts 18, the inner ends of locking rods 19, each of which are formed of inner and outer sections 20 and 21, respectively, which are joined at their adjacent ends by a turn buckle 22, to permit the rods to be adjusted so as to increase or decrease the length thereof as desired. In threaded engagement with the sections of the locking rods 19, and at opposite ends of the turn-buckles 22, are jam or lock nuts 23, which serve to prevent accidental turning of the latter.

Formed on the inner face of the rim 14, between its beveled edge 16, and the felly 13, are bosses 24, containing suitable openings which register with like openings in the said rim 14, to slidably receive the outer free ends of the sections 21, of the locking rods.

Removably mounted upon the rim 14, is a tire supporting rim 25, the latter formed with opposed clencher flanges 26, to detachably connect to the rim a tire which may be either of the pneumatic or cushion type in common use. In the inner face of the demountable rim 25, are recesses or slots 28, which are correspondingly shaped with respect to the beveled extremities 29, of the locking rods so that when the latter are shifted to locked position they will engage the said recesses or slots 28, so as to move the rim 25, for positive engagement of the clencher flange 15 therewith and lock the said tire and rim upon the wheel.

To hold the disk 17, rotatably mounted upon the hub and prevent lateral displacement thereof there is provided a locking ring 30, which is detachably secured to the collar 10, upon the hub. Pivoted to the inner face of the disk 17, are a series of antifriction rollers 31, which latter are adapted to travel upon an annular shoulder 32 formed on the said collar 10. The said disk 17, in its peripheral edge at one side of the rocking rods 19, contains notches 33, so that upon turning of the disk 17, the rods at their inner pivoted ends will clear the said disk and in this manner will not interfere with the movement of the locking rods when being shifted to release the detachable rim so that the latter can be removed from the wheel.

Secured to the disk 17, is a rigid arm 34, to permit the turning thereof for moving the rods 19, into locked or unlocked position. At diametrically opposite points of the flange 11, and projecting therefrom are stop pins 35, arranged to limit the movement of the locking rods in one direction and which stop pins are mounted for detachment at the will of the operator.

To lock the disk 17, against rotation when the locking rods 19, have been shifted in engagement with the detachable rim 25, one of the bolts 18, is adapted to be turned into engagement with a suitable opening 36, in the outer face of the flange 11, and therefore it is necessary to make the said bolt of greater length than the other bolts forming the pivots for the locking rods.

Should it be desired to remove the tire supporting rim 25, it is necessary to withdraw the bolt from the opening 36, which will free the disk 17, and upon rotation thereof in one direction upon the hub the pivoted locking rods are shifted so as to have the beveled extremities 29 retract from within the slots 28, in the rim 25, and thereby permit the ready and easy removal of said rim 25, from the wheel, without the necessity of deflating its tire supported thereon.

What is claimed is:—

1. The combination with a vehicle wheel and its felly, of an annular rim secured to said felly, a removable rim supported by said fixed rim and having recesses in its under face, a rotary disk carried by the wheel and locking pins pivoted to said disk and adapted to engage in said recesses to securely fasten the removable rim to said fixed rim.

2. The combination with a vehicle wheel having a felly and hub, of a fixed rim secured to said felly and having a clencher flange at one edge thereof, a removable rim having recesses at intervals therein a rotary disk carried by the hub, extensible locking pins pivotally connected to said disk and having their opposite free ends working through said fixed rim and adapted to engage in the recesses of the removable rim to lock it on the fixed rim, means for locking the disk against rotation, and a handle fixed to said disk.

In testimony whereof, I affix my signature, in presence of two witnesses.

JAMES HAMILTON.

Witnesses:
 JOHN VEATCH,
 ROBT. MCGREGOR.